US005915622A

United States Patent [19]

Foote

[11] Patent Number: 5,915,622

[45] Date of Patent: Jun. 29, 1999

[54] SHOWER SPA FIXTURE AND CARTRIDGE

[76] Inventor: Steven Foote, 6382 Falling Water Dr., Huntington Beach, Calif. 92647

[21] Appl. No.: 08/863,108

[22] Filed: May 23, 1997

Related U.S. Application Data

[63] Continuation-in-part of application No. 08/520,395, Aug. 29, 1995, abandoned.

[51] Int. Cl.$^6$ .............................. B05B 7/28; B01D 11/02

[52] U.S. Cl. ............................ 239/10; 239/317; 239/304

[58] Field of Search ............................ 239/10, 305, 310, 239/315, 317, 304, 419.3; 222/87

[56] References Cited

U.S. PATENT DOCUMENTS

| | | | |
|---|---|---|---|
| 956,101 | 4/1910 | Inglis . | |
| 1,668,802 | 5/1928 | Cautrell | 239/304 |
| 1,681,362 | 8/1928 | Pike . | |
| 1,967,909 | 7/1934 | Sonner . | |
| 2,120,774 | 6/1938 | Belmont | 239/317 X |
| 2,602,697 | 7/1952 | Otto et al. . | |
| 3,486,695 | 12/1969 | Novak . | |
| 3,581,996 | 6/1971 | Boyer . | |
| 3,628,732 | 12/1971 | Vicari . | |
| 3,713,585 | 1/1973 | Conklin | 239/305 X |
| 3,759,284 | 9/1973 | Crowley | 239/310 X |
| 3,847,354 | 11/1974 | Lemond | 239/317 |
| 4,027,822 | 6/1977 | Usher | 239/310 X |
| 4,099,672 | 7/1978 | Sheahan et al. . | |
| 4,121,773 | 10/1978 | Headen et al. . | |
| 4,200,206 | 4/1980 | Chase et al. . | |
| 4,219,158 | 8/1980 | Lacy . | |
| 4,225,085 | 9/1980 | Headen et al. . | |
| 4,294,280 | 10/1981 | Tom . | |
| 4,385,034 | 5/1983 | Gacer . | |
| 4,933,080 | 6/1990 | Rundzaitis et al. . | |

FOREIGN PATENT DOCUMENTS

| | | | |
|---|---|---|---|
| 2817043 | 10/1979 | Germany | 239/305 |

*Primary Examiner*—Kevin Weldon
*Attorney, Agent, or Firm*—William J. Kearns

[57] ABSTRACT

The shower spa fixture is mounted between an inlet pipe and a shower head and includes a container for mixing a stream of water with additives. A portion of the stream of water passing from the inlet pipe to the shower head is diverted into the container. The container includes a replaceable cartridge which has a first additive in a first chamber and a second additive in a second chamber. The diverted stream of water mixes with the first additive in the first chamber, passes through a screen to the second chamber, and mixes with the second additive in the second chamber. The diverted stream containing additives is then returned to the main stream of water which exits the shower head. The amount of additives added to the main stream of water is controlled by a control valve. The present invention provides an improvement over known arrangements by providing two additives which are kept separate from one another preventing a chemical reaction between the additives which would cause a loss of potency.

17 Claims, 5 Drawing Sheets

SHOWER SPA FIXTURE AND CARTRIDGE

This application is a continuation-in-part of application Ser. No. 08/520,395 filed Aug. 29, 1995 now abandoned.

BACKGROUND OF THE INVENTION

1. Field of the Invention

The present invention relates to a device for providing additives to shower water and more particularly to a fixture mounted on an inlet pipe to a shower head which diverts a portion of a shower stream and mixes the diverted stream with additives such as mineral salts and oils.

2. Description of the Related Art

Conventional showers generally include an inlet pipe whose end is connected by a threaded connection to a conventional shower head. A number of arrangements have been suggested for use with shower heads so as to provide a means for mixing various liquid or solid additives such as soap, shampoo and body oils with water for delivery to the body of a user. These known arrangements are mounted between the water inlet pipe and the shower head and allow the user to apply a variable amount of additive to the shower water.

Arrangements for providing shower additives are generally of two types. The first type dispenses liquid additives directly into the water stream by a controlled dispensing apparatus. Examples of such liquid dispensing arrangements are shown in U.S. Pat. Nos. 3,486,695 and 4,219,158 and are illustrations of the use of bulk quantities of additive materials. The second type of arrangement diverts a portion of a water stream or the entire water stream into a mixing chamber where the water dissolves and mixes with an additive provided in the mixing chamber. Examples of this type of arrangement are shown in U.S. Pat. Nos. 3,581,996 and 3,847,354.

The use of a mixture of aromatic botanical extracts with water for bathing is known as aromatherapy. The mixture of aromatic botanical extracts and mineral salts with a water stream would be a desirable combination for a bath or shower; however, if botanical extracts are exposed to mineral salts for a prolonged period of time, the mineral salts will cause oxidation of the extracts. This oxidation of the extracts greatly reduces the value and benefit of the aromatic character of the extracts. Therefore, in the known arrangements, it is difficult, if not impossible to combine the effects of botanical extracts and mineral salts in a stream of shower water.

SUMMARY OF THE INVENTION

The present invention provides an improvement over the known arrangements for providing additives to a shower stream by allowing two additives which would chemically react if kept in contact with one another to be added simultaneously to the shower stream by maintaining the additives in separate chambers. In the present invention, a portion of the shower stream is diverted through one or more mixing chambers where it is is mixed with additives such as aromatic botanical extracts and mineral salts.

The present invention relates to a dispensing fixture for providing additives to a stream of water including a container for mixing the water with additives and a means for mounting the container between an inlet pipe and a shower head. The means for mounting includes an inlet, an outlet and a passage for water between the inlet and the outlet. A replaceable cartridge is mounted within the container and includes a first chamber containing a first additive and a second chamber containing a second additive. An opening is provided for diverting a portion of the water from the passage into the container and a control means is provided for controlling the flow of diverted water.

According to another aspect of the present invention, the invention relates to a method of providing at least two additives to a main stream of water. The method includes the steps of diverting a portion of the main stream of water into a container having a first chamber containing a first additive and a second chamber containing a second additive. The diverted stream is then mixed with the first additive in the first chamber and passed through a screen into the second chamber. The diverted stream containing the first additive and the second additive is then returned to the main stream of water.

The improvement of this invention over the prior art is due to the arrangement that permits using a mixture of dry salts and botanical extracts in a replaceable cartridge so that they are kept in separate compartments within the cartridge prior to use to preserve the potency of the botanical extracts over a reasonable storage life. It also reduces mechanical complexity of the dispensing fixture by eliminating complex valving arrangements employed for mixing additives. When the water is turned on, the additives are mixed and dispensed automatically without having to adjust any valves. This is accomplished by making the cartridge in at least two sections so that the diverted water flows through the first section holding the soluble salts and then through the second section holding the botanical extracts and then back into the mainstream, the mixing action taking place automatically because of the turbulent water flow through the series arrangement of the sections within the capsule.

It is therefore an object of this invention to provide a means for adding a single component or a mixture of a plurality of mineral salts and botanical extracts to a shower stream.

Another object of the invention is to provide a replaceable cartridge that stores one or more additives in separate compartments to prevent chemical reaction among any constituents stored therein and that also serves as the mixing chamber for the additives.

A further object is to provide a replaceable cartridge with fixed proportions of additives so that it is not necessary to adjust valves while taking a shower to set the desired combination of salts and oils; the identity of the additives and their proportions are specified by person readable text, color, or code on the storage cartridge.

BRIEF DESCRIPTION OF THE DRAWING FIGURES

The invention will be described in greater detail with reference to the accompanying drawings in which like elements bear like reference numerals:

DETAILED DESCRIPTION

Figure 1:
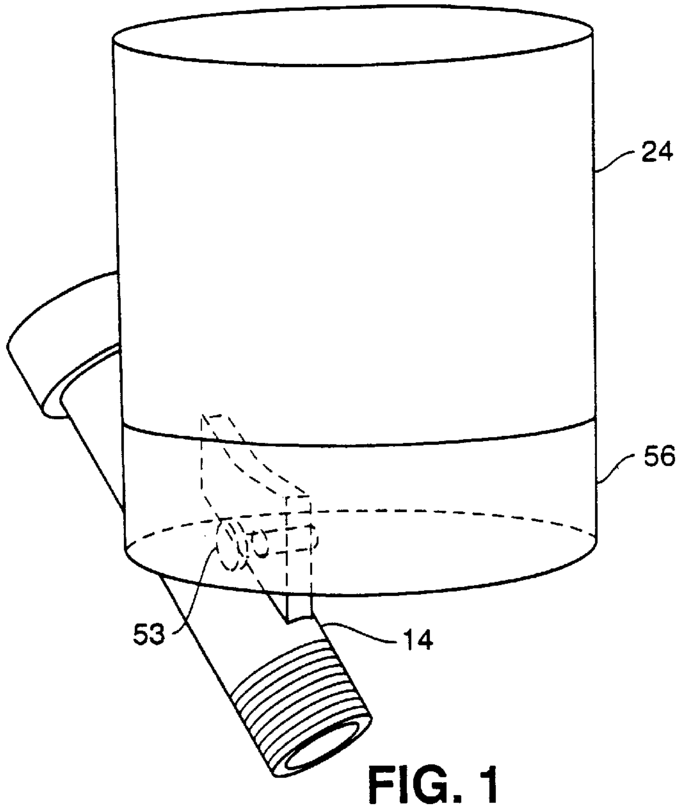
FIG. 1 is a perspective view of the shower spa fixture according to the present invention.
Figure 2:
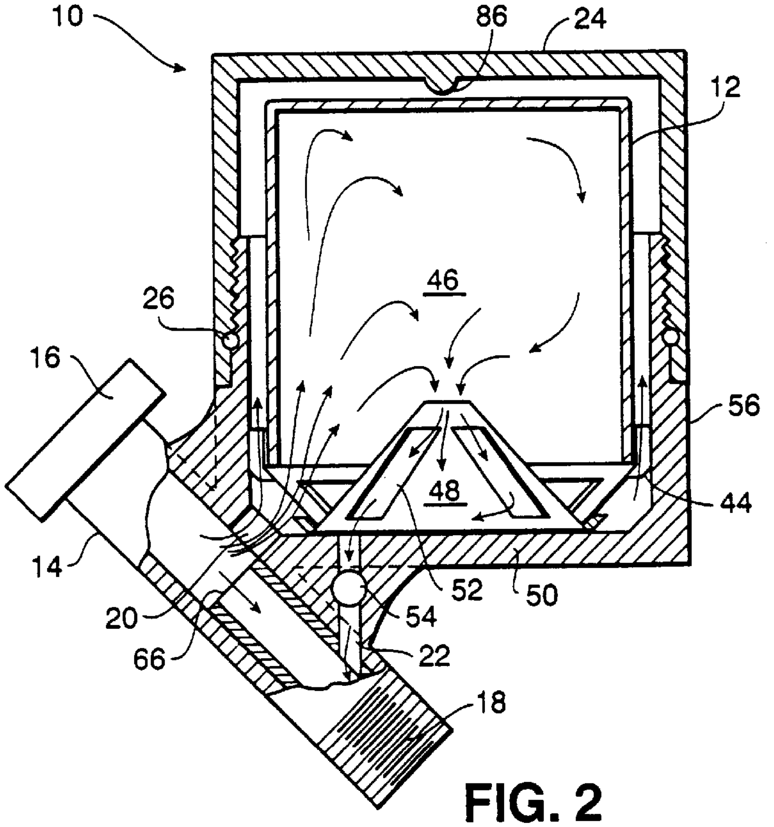
FIG. 2 is a cross sectional view of the fixture shown in FIG. 1 with water flow lines shown.

The preferred embodiment of the shower spa fixture according to the present invention includes a container 10 for mixing a diverted portion of a stream of water with various additives which are provided in a replaceable cartridge 12 mounted within the container. As shown in FIGS. 1 and 2, a fitting 14 is provided which allows the container 10 to be mounted on a water inlet pipe. The fitting 14 has an internally threaded portion 16 at one end to be attached to the inlet pipe (not shown) and an externally threaded portion 18 for attaching a conventional shower head (not shown) to the fixture. A portion of the water stream passing through the fitting 14 from the water inlet pipe to the shower head is diverted into the container 10 through the intake opening 20 where the water mixes with additives in the replaceable cartridge 12. The diverted water stream then returns to the main water stream through the outlet opening 22. The pressure differential driving the diverted water through the dispenser is caused by a positive displacement of water into opening 20 by the reduction in diameter due to insert 66 in fitting 14 and a reduction in pressure at outlet opening 22 as a consequence of the increased main stream velocity at that point. Note that varying the size of the inside diameter of insert 66 is a way to set up various operating pressure differentials.

The container 10 is preferably of a cylindrical shape, has a base 56 that is connected at a lower edge to the the top surface of fitting 14, and a cover 24 which is generally cylindrical in shape and has internal threads at a lower edge thereof for engaging external threads on base 56 and is sealably attachable thereto. A sealing ring 26 is provided between base 56 of the container 10 and the cover 24 to prevent water from leaking out of the container. The cover 24 may be easily removed to allow replacement of the cartridge 12 when the additives have been depleted. Container 10 is attached to fitting 14 with its axis vertical to facilitate replacement of the cartridge. With cover 24 removed, cartridge 12 drops into and nests in base 56, thus holding it in position while the top 24 is reattached. Openings 40 in angled wall 38 of the cartridge ensure that prercise rotational positioning of the cartridge is not required for proper flow. This ease of cartridge replacemant is important for people with limited dexterity.

Figure 3:
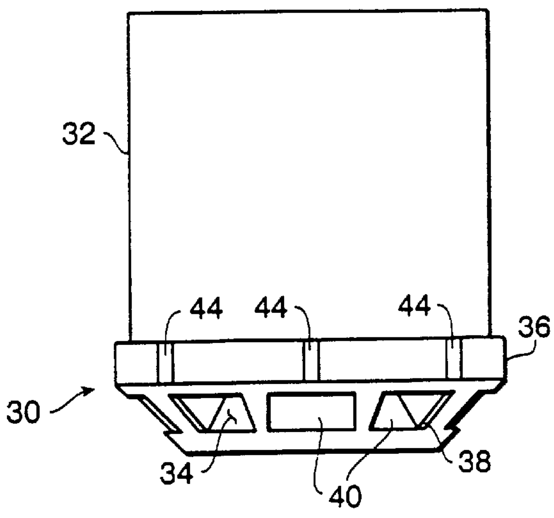
FIG. 3 is a front view of the cartridge according to a first embodiment of the present invention.
Figure 4:
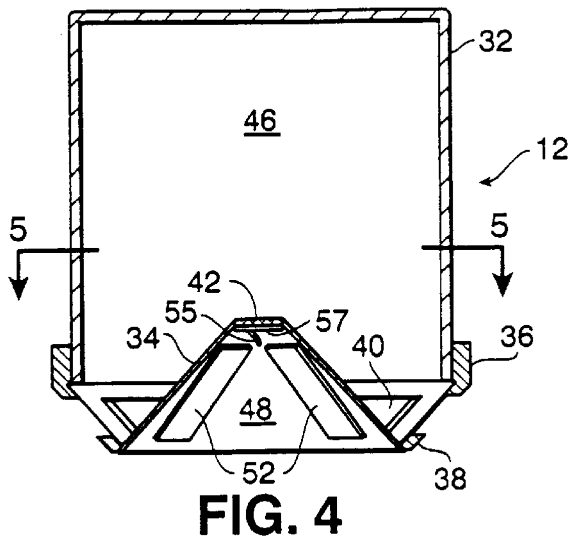
FIG. 4 is a cross sectional view of the cartridge shown in FIG. 3.
Figure 5:
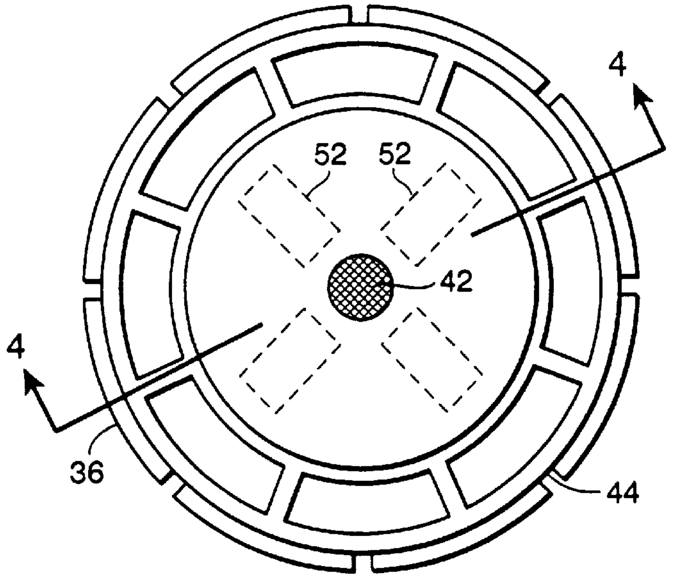
FIG. 5 is a top view of the lower part of the cartridge shown in FIG. 3.
Figure 7:
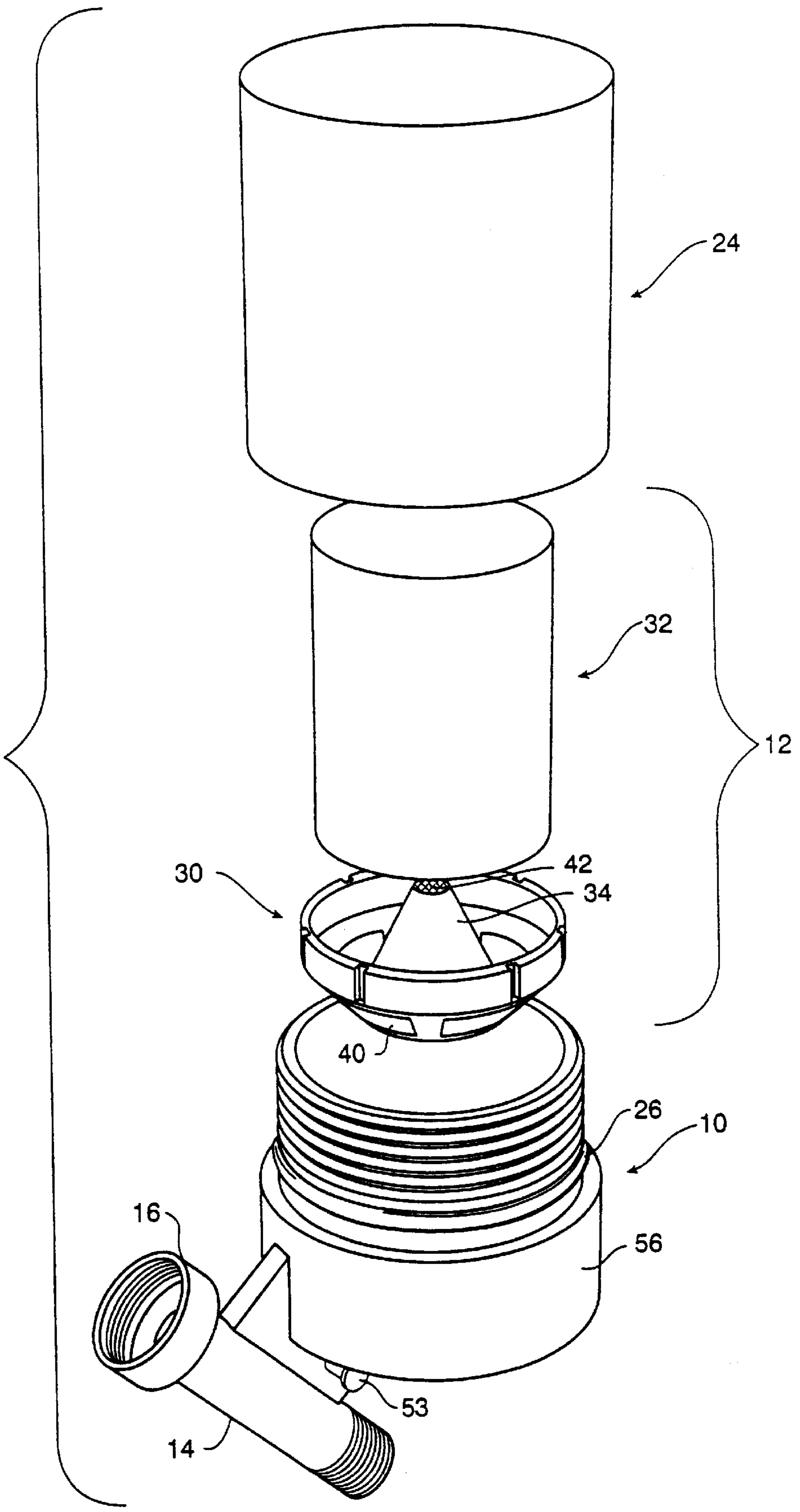
FIG. 7 is an exploded cross sectional view of the cartridge and fixture of FIG. 1.

In the preferred embodiment, cartridge 12, as shown in FIGS. 3–5, includes a cartridge bottom 30 and a cartridge top 32. With reference to FIG. 7, container 10 and cartridge 12 are shown in an exploded view. Both bottom 30 and top 32 of cartridge 12 are thermoformed of thin,plastic material commonly used for non-reusable and throw-away packaging envelopes. The cartridge bottom 30 includes a cone shaped wall 34 projecting inward, a short, cylindrical side wall 36, and an angled wall 38 connecting the cone shaped wall 34 and the cylindrical wall 36. Cartridge top 32 fits into bottom 30 and is held therein by mechanical force fit, by plastic welding, or other low cost method. The angled wall 38 includes a series of circumferential openings 40 along its surface. These openings 40 may be of any size and shape which adequately allow diverted water to pass into the cartridge and allow water remaining in the cartridge to drain from the cartridge when the shower is not in use. The conical wall 34 of the cartridge is truncated by a circular opening at the top in which a mesh screen 24 is positioned. The mesh screen serves as a water permeable membrane that separates the mineral salts in cartridge top 32 from the aromatic oils in strips 52 in cone shaped bottom 30 of cartridge 12. The size of the mesh is small enough to hold the bulk of the crystalline salts but large enough to allow proper flow through the cartridge. The physical form of the salts is crystalline with a wide range of crystal sizes such as found in rock salt and as such will also have a quantity of very fine particles called fines that could penetrate the membrane. The fines are no problem while the cartridge is in use but could be a problem during storage as discussed below.

The cylindrical cartridge top 32 fits inside the short cylindrical side wall 36 of the cartridge bottom 30. With reference to FIGS. 3 and 5 cylindrical side wall 36 is provided with side slit-shaped openings 44 which allow some of the diverted water to flow around all sides of the cartridge 12 to equalize water pressure across the wall of the cartridge within the container. The openings 44 are shown by way of example as slits; however, the openings may be of any shape and may be located at any position on the cartridge top which is adequate to allow a flow of water around the cartridge.

The preferred embodiment of the cartridge 12, as described above, forms a first chamber 46 between the conical wall 34 and the cartridge top 32 which may be filled with water soluble sodium based mineral salts such as sodium sesqui-carbonate, sodium laurel sulfate, sodium chloride or other mineral salts such as epsom salts. A second chamber 48 is formed between the conical wall 34 and a lower surface 50 of the container 10. Additive containing strips 52 are mounted on the underside of the conical wall 34 within the second chamber 48. The additive containing strips 52 may be formed of either a fibrous material, such as fabric, or a porous material like a sponge which can be saturated with a liquid additive. Preferred aromatic additives are botanical extracts, volatile oils or essential oils; however, other aromatic liquid additives which can be absorbed in the strips 52 may also be used. Using additives of two or more varieties to saturate the strips can produce various desirable effects to the bather. Strips 52 are shown in FIGS. 2 thru 5 as rectangular strips. In other embodiments they can be in the form of sectors of a circle to allow denser packing, or as annular rings parallel to the plane of the bottom of the cartridge.

Figure 6:
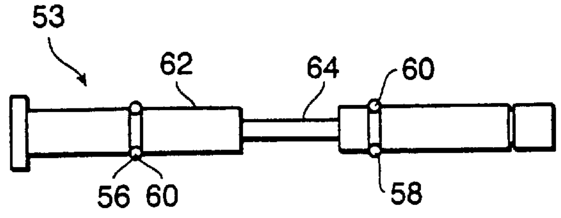
FIG. 6 is a side view of a valve cylinder for use in the fixture of FIG. 1.

The flow controlling exit opening 22 extends through the lower surface 50 of the container 10 and allows the water with additives to pass from the container 10 back to the main water stream in fitting 14. A sliding flow control valve means 53 is provided in a bore 54 which extends transversely through the exit opening 22. A side view of the flow control valve means 53 is shown in FIG. 6. The valve means 53 is a cylindrical control member provided with circumferential grooves 56 and 58 for receiving O-rings 60 which provide a seal between the valve and the bore 54 and prevent the valve from leaking. When the valve 53 is mounted in bore 54 of the fixture, both ends of the valve extend from the fixture and are used to slide the valve from a closed position where a large diameter 62 of the valve obstructs the opening 22 to an open position where a small diameter 64 of the valve intersects the opening 22. The flow rate of water through the container 10 may be adjusted by pushing on the ends of the valve control means 53 and sliding the valve so that different diameter cross sections intersect the opening 22. Control of the diverted flow is required in this invention for preventing unnecessary loss of additive while adjusting the water temperature or setting the main flow rate. Valve 53 can vary the diverted flow rate anywhere from zero to maximum but in the preferred embodiment serves as an on-off valve. Valve 53 could also be a stopcock or rotary swing valve to achieve the same flow rate control.

In operation, the internal threaded portion 16 of the fitting 14 is screwed onto an inlet pipe and a shower head is screwed onto the externally threaded portion 16 of the fitting. A cartridge 12 containing at least one additive stored in a first chamber 46 and at least one additive absorbed in the absorbent strips 52 stored in a second chamber 48 is inserted into the container 10. The cover 24 is then screwed onto the container which is sealed by the O-ring 26. When a stream of water passes through the fitting 14, a portion of the stream of water is diverted through the diverting opening 20 into the container 10. The curved arrows in FIG. 2 indicate approximate directions of water flow within the cartridge 12 and container 10; the straight arrow indicates the main stream flow. The diverted water enters the cartridge 12 through the circumferential openings 40 and mixes with the mineral salts or other solid additives in the first chamber 46. The water then passes through the mesh screen 42 at the top of the conical wall 34 into the second chamber 48 where the mineralized water mixes with the botanical extracts absorbed in the strips 52. The mineralized water with botanical extracts exits the container 10 through the opening 22 where it mixes with the main water stream and exits the shower head. A small amount of water flowing through the slit shaped openings 44 does not flow into the interior of the cartridge but into the annular space between the cartridge and the container to produce a static pressure counterbalancing the internal pressure in the cartridge.

The quantity of additive materials in a cartridge at maximum diverted flow rate is sufficient for showers lasting between seven and ten minutes, a normal time for most showers.

An important feature of the replaceable cartridge of the preferred embodiment is that it serves as a mixing chamber for the chemicals since all of the mixing of chemicals occurs within the envelope of the cartridge. Shower chemicals, particularly salts, tend to agglomerate and build deposits on parts of the apparatus. Since all the concentrated chemicals are confined to the interior of the cartridge, removing the used cartridge also removes most of any residue, thus facilitating the cleaning process and protecting the spa fixture from the build-up of undesirable deposits.

Figure 8:
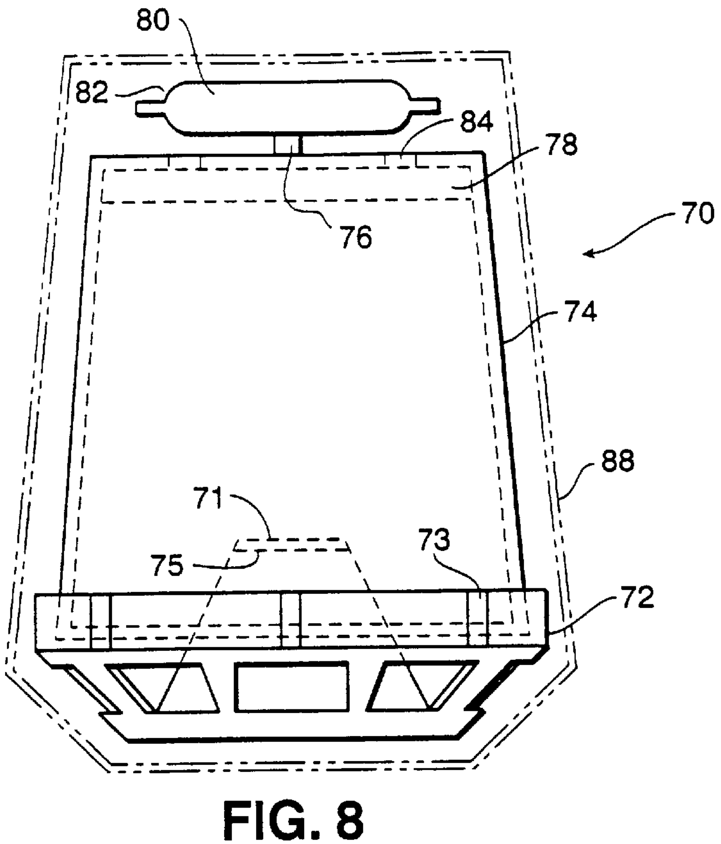
FIG. 8 is a side view of the cartridge according to a second embodiment of the invention with a protective wrapping shown in phantom.
Figure 9:
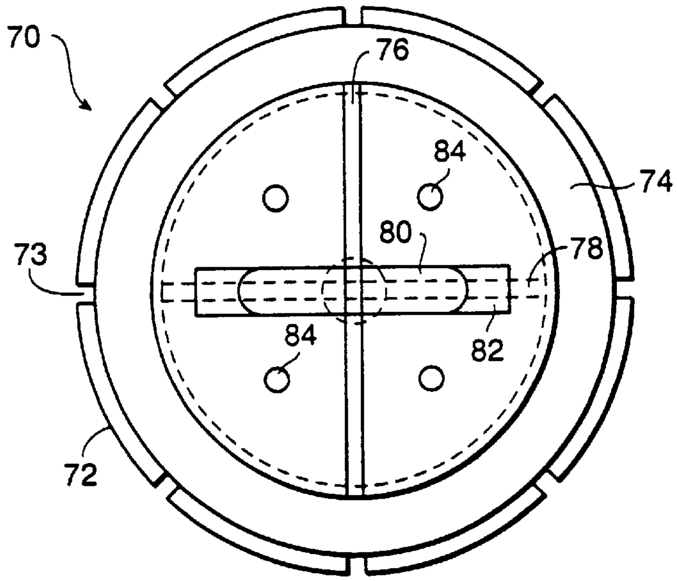
FIG. 9 is a top view of the cartridge of FIG. 8.

A second embodiment of a replaceable cartridge is shown in FIGS. 8 and 9. Cartridge 70 includes a cartridge bottom 72 which is substantially similar to the cartridge bottom 30 of the first embodiment; however, the fibrous strips 52 are eliminated. Just as with bottom 30 in the cartridge of FIGS. 4 and 7, cartridge bottom 72 also has a water permeable membrane 71 to contain the salts stored therein and may also have a plastic cover seal 75 to keep fines from escaping from cartridge top 74. The cartridge 70 includes a cartridge top 74 having a tapered sidewall which facilitates stacking of the cartridge tops during production. The tapered sidewall can be used equally well with the cartridge top 32 of the preferred embodiment shown in FIG. 7. An external ridge 76 extends across the outside of the cartridge top while an internal ridge 78 extends perpendicular to the external ridge on the inside of the cartridge top. An ampule 80 containing a liquid additive such as a botanical extract or oil is positioned on top of the cartridge top 74 perpendicular to and on top of the external ridge 76.

The ampule 80 is constructed as a glass capsule containing a liquid, and the entire glass capsule is surrounded by a fibrous covering 82 or sleeve which is sealed together at each end of the capsule. The glass capsule inside the fibrous covering may be broken to release the contained liquid through the fibrous material covering 82; the fibrous covering prevents broken glass from escaping. The ampule is positioned on top of the cartridge top 74 with a portion of the ampule positioned on top of the external ridge 76. The ampule 80 may be attached to the cartridge top in any acceptable manner such as by adhesive or by staples extending through the excess fibrous material at either end of the ampule.

Figure 11:
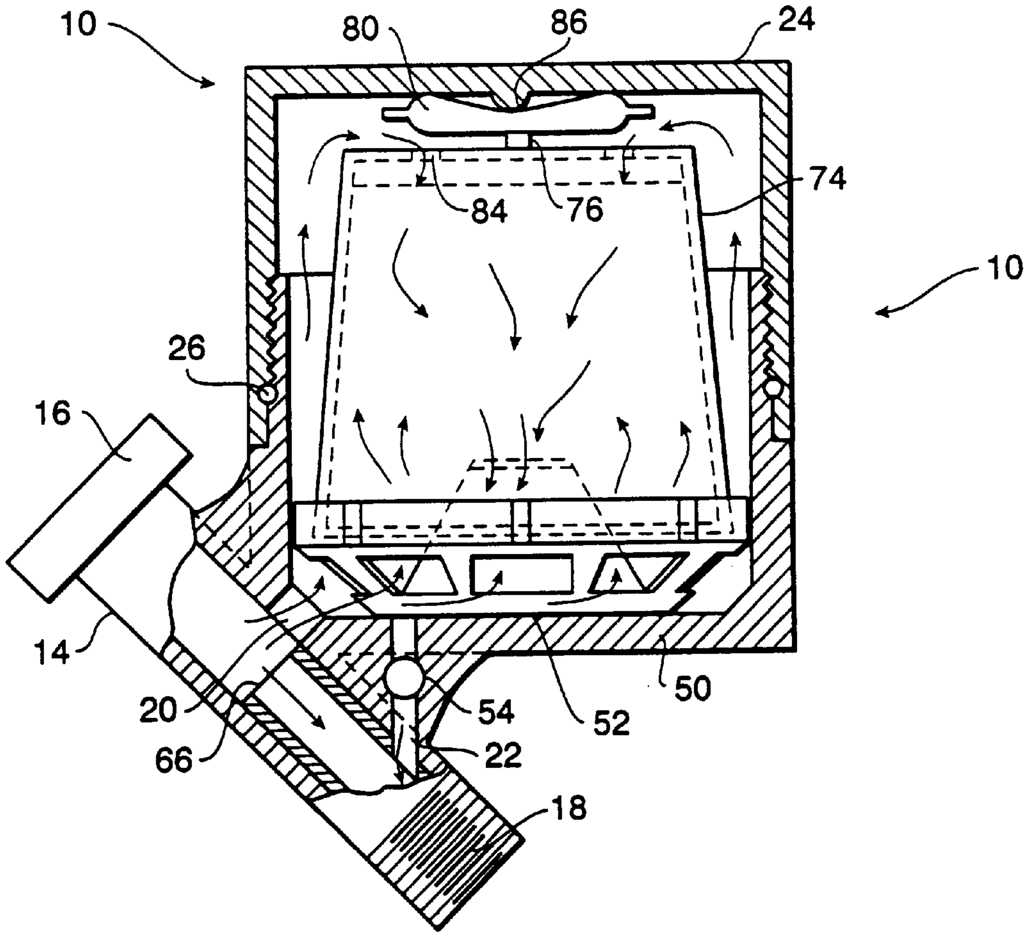
FIG. 11 is a cross sectional view of the fixture shown in FIG. 1 with water flow lines for the cartridge of the second embodiment shown in FIG. 8.

The second embodiment of the cartridge 70 is used in conjunction with the fixture shown in FIGS. 1 and 2. The cartridge is placed inside base 56 of the container 10 and the cover 24 is screwed onto the container so that the projection 86 on the inside top of the cover 24 engages and presses the ampule 80 down onto the external ridge 76 which acts as a wedge to break the glass capsule as can be seen with reference to FIG. 11. In this second embodiment the flow pattern of the diverted water is different from the flow pattern that occurs with cartridge 12 shown in FIG. 2. In this case flow of pressure equalizing water through slits 44 in the wall of cartridge bottom 72 is not static but flows upward along the wall of cartridge top 74 and at the top mixes with the liquid additive which is squeezed from the broken ampule 80 by the closing of the cover 24. The mixture of liquid additive and water passes through holes 84 in the top of the cartridge where it mixes with the solution of salts within cartridge top 74. The holes 84 may be provided in any shape, size and arrangement which allows adequate mixing of the additive (s) with the diverted water stream. The ampule 80 provides a means by which a liquid additive may be maintained separate from the solid additive to prevent oxidation until the time that the cartridge is inserted into the fixture for use. The first and second embodiments of the cartridge 12 and 70 have separate chambers for solid mineral salts and liquid botanical extracts that allow the botanical extracts to be used to their full potential by preventing oxidation of the extracts by prolonged contact with the mineral salts.

The cartridges according to the present invention are easily replaced, disposable, prefilled cartridges, thereby obviating any requirement on the part of the user to handle additive chemicals. Prefilled cartridges according to the invention have a long shelf life due to the physical separation of the mineral salts and botanical extracts.

Figure 10:
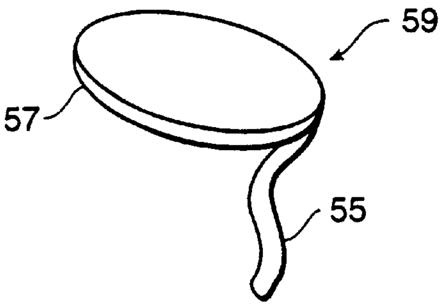
FIG. 10 is a detail of a protective cover seal with pull tab.

Using prefilled cartridges makes it possible to take advantage of packaging techniques like plastic shrink wrap that provides an economically viable method for encapsulating each cartridge in a see-through moisture proof barrier. FIG. 8 shows a schematic representation of a shrink fit encapsulation 88 around the cartridge that, for clarity. is not shown to be fully shrunk onto the surface of the capsule as it would be in its finished state. As discussed earlier, in the case of cartridge 12 of the preferred embodiment, the water permeable membrane 42 is covered with plastic cover seal assembly 59 as shown in FIG. 10. Seal disc 57 covers and seals the pores in water permeable membrane 34 to isolate second chamber 48 from first chamber 46 to prevent fine particulates of dry, granular additive material in chamber 46 from penetrating membrane 42 and interacting with the aromatic oils absorbed in porous strips 52 during storage. Cover seal 59 is, of course, inside the protective shrink wrap. However, it is easily removed with pull tab 55 accessible from the outside of inverted cone 34 when shrink wrap cover 88 is removed prior to cartridge installation.

Descriptive identification of each capsule may be printed either on the outside of shrink wrap cover 88 or on the cartridge itself as a readily visible name, number, color, or a combination all three as an identifying code. It is therefore possible to store cartridges in moisturized environments like bathrooms without any caking or solidifying of additive materials as would occur with unsealed containers used for bulk storage of dry materials. Prefilled cartridges also eliminate the problem of bulk storage of liquid additives. Although the preferred embodiment utilizes prefilled, disposable cartridges as described above, it would be obvious to one skilled in the art to substitute refillable cartridges for use with the dispenser of this invention if cost or customer preferences outweigh the convenience feature.

The apparatus and method of this invention thus provide advantages to the user over the prior art in that only one on-off flow control is needed by the user to get the full effect of mixed additives in the shower. While the invention has been described in detail with reference to a preferred embodiment thereof, it will be apparent to one skilled in the art that various changes can be made, and equivalents employed without departing from the spirit and scope of the invention.

What is claimed is:

1. A dispensing fixture for providing a plurality of additives simultaneously to a main stream of water comprising, in combination:

a container having a base and a cover sealably attachable to said base, the container demountably enclosing a replaceable cartridge containing a plurality of additives stored within the cartridge in separate compartments;

said container being mounted atop a pipe carrying a main stream of water and having a connection to said pipe for diverting water into the container from the main stream and a connection to said pipe for carrying water out of the container back to the main stream, the container being located between the inlet and outlet of the pipe with the axis of the container oriented vertically;

said vertical axis of the container allowing the replaceable cartridge to drop into and nest within the base of the container and be secured by the cover of the container, the openings in said cartridge ensuring proper flow of diverted water through the cartridge regardless of the rotational orientation of the cartridge;

said replaceable cartridge serving as a mixing chamber through which water diverted from the main stream passes through a first chamber containing at least one additive, then through a water permeable membrane into a second chamber containing at least one more additive and returning back to the main stream, the diverted water carrying a mixture of additives;

means for starting and stopping the flow of diverted water;

said cartridge further having water passages for a flow of water into the annular space between the cartridge and the container; and said cartridge serving as a disposable mixing chamber for potentially corrosive, concentrated additive materials in their passage through the dispensing fixture, thus protecting and facilitating cleaning of the dispenser.

2. The dispensing fixture of claim 1, wherein said means for starting and stopping the flow of diverted water is a valve with a sliding cylinder having a large diameter section for blocking the flow of water and a small diameter section for full flow of water.

3. The dispensing fixture of claim 1 wherein said means for starting and stopping the flow of diverted water is a valve in the form of a stopcock adapted to fit the scale of the dispenser.

4. The dispensing fixture of claim 1 wherein said means for starting and stopping the flow of diverted water is a swing valve in the form of a lever rotating in a plane normal to the axis of the water connection and rotating about a fulcrum aside from the axis of the connection so as to swing an obstruction into or out of the flow path in the outlet water connection.

5. A replaceable storage cartridge for a multiplicity of mineral salts and aromatic extracts for use in a dispensing fixture attached to a shower comprising:

a first chamber containing at least one salt from the family of medicinal salts of the sodium based and epsom salts type;

a second chamber containing at least one additive from the class of aromatic extracts and oils;

said first and second chambers separated by a water permeable barrier;

said first chamber having an entrance aperture to allow a stream of water diverted from the main stream to enter and said second chamber having an exit aperture to allow the diverted stream of water to exit the cartridge, the flow pattern of the water first mixing with the salts in the first chamber, then passing through the water permeable membrane into the second chamber to mix with extracts and oils, the diverted stream then returning to the main water stream;

the quantity of additives in the first chamber and the quantity of additives in the second chamber being set to establish a fixed, preset ratio of dissolved salts to the volume of aromatic extracts and oils;

said preset ratios and additives being plainly identified by a readily visible, person readable coding means; and said cartridge enclosed in a protective wrapping providing a barrier to external influences yet easily removable to allow installation into a dispensing fixture.

6. The replaceable cartridge of claim 5 wherein the second chamber is conical.

7. The replaceable cartridge of claim 5 wherein a screen is provided for the water permeable membrane between the first and the second chamber.

8. The replaceable cartridge of claim 5 wherein a removable dust seal is provided on the outside of the water permeable membrane between the first and second chamber.

9. The replaceable cartridge of claim 5 wherein the second chamber includes absorbent strips that are rectangles mounted on a wall of said second chamber.

10. The replaceable cartridge of claim 5 wherein the second chamber includes absorbent strips that are sectors of a circle mounted on a wall of said second chamber.

11. The replaceable cartridge of claim 5 wherein the second chamber includes absorbent strips that are annular rings mounted on a wall of said second chamber.

12. The replaceable cartridge of claim 5 wherein said protective wrapper is moisture vapor sealing material like shrink wrap plastic.

13. The person readable coding means of claim 5 wherein said coding is a combination of color code, numeric code and text.

14. A replaceable storage cartridge for simultaneous dispensing of a multiplicity of mineral salts and aromatic extracts for use in a dispensing fixture attached to a shower comprising:

a first chamber containing at least one salt from the family of medicinal salts of the sodium based and epsom salts type;

a second chamber in the form of a glass ampule containing at least one additive from the class of aromatic extracts and oils, said second chamber positioned directly on top of the first chamber;

said ampule being broken by force of the container cover bearing against the capsule and a ridge on the top surface of said replaceable cartridge as said container cover is screwed onto the container;

said ampule being fully contained in a porous covering to contain loose glass particles arising from breaking the ampule;

said first chamber having entrance apertures to allow a stream of water diverted from the main stream to to enter the first chamber from below and the second chamber from above, the flow pattern of the water through the second chamber carrying the additive of the second chamber into said first chamber and mixing with the salts therein;

the first chamber having an exit aperture to allow the diverted stream now mixed with additives of salts, extracts and oils, to return to the main water stream;

the quantity of additives in the first chamber and the quantity of additives in the second chamber being set to a fixed, preset ratio of dissolved salts to the volume of aromatic extracts and oils;

said cartridge enclosed in an external protective wrapping providing a barrier to external influences yet easily removable to allow installation into a dispensing fixture.

15. The replaceable cartridge of claim 14 wherein said external protective wrapper is moisture vapor sealing material like shrink wrap plastic.

16. The replaceable cartridge of claim 14 wherein said preset ratios and types of additives are plainly identified by a person readable coding means on an external surface of the cartridge.

17. A method for dispensing a plurality of additives simultaneously to a main stream of water comprising the steps of:

arranging a reloadable container containing a replaceable cartridge holding a supply of additives to be dispensed so that a portion of up stream water is diverted so as to pass into the container, through the cartridge and out of the container to return to the main stream at a down stream point;

arranging the internal configuration of the cartridge so that the diverted stream enters a first chamber to mix with at least one additive stored therein to make a first mixture, the first mixture then enters a second chamber to mix with at least one additional additive stored in the second chamber to make a second mixture, the second mixture passing out of the cartridge and into the main stream;

equalizing the water pressure on both sides of the cartridge by causing some of the incoming diverted water to flow into the annular space between the replaceable cartridge and the container; and providing a means for starting and stopping the flow of diverted water.

* * * * *